United States Patent Office 3,133,957
Patented May 19, 1964

3,133,957
PURIFICATION OF ACRYLONITRILE
Frederick James Bellringer, Leatherhead, England, assignor to The Distillers Company Limited, Edinburgh, Scotland
No Drawing. Filed Mar. 17, 1961, Ser. No. 96,376
Claims priority, application Great Britain Apr. 7, 1960
7 Claims. (Cl. 260—465.9)

This invention relates to the purification of acrylonitrile, and in particular to the separation of substantially pure acrylonitrile from mixtures of acrylonitrile and acetonitrile.

Certain processes for the production of acrylonitrile result in a crude product which is a mixture of acrylonitrile and acetonitrile. The separation of pure acrylonitrile from this mixture by normal fractional distillation methods is difficult and costly owing to the small temperature difference between the boiling points either of the two compounds themselves, or of their azeotropes with water.

According to the present invention the process for the separation of acrylonitrile from a mixture of acrylonitrile and acetonitrile comprises extracting the mixture with water and a substantially water-immiscible organic solvent for acrylonitrile whereby the acetonitrile is extracted into the water and the acrylonitrile is extracted into the organic solvent.

The starting material may comprise any mixture of acrylonitrile and acetonitrile. It is preferred, however, to apply the process of the present invention to a crude acrylonitrile product containing only a minor proportion of acetonitrile, for instance suitably less than 30% by weight, preferably less than 18% by weight and most preferred about 2 to 3% by weight.

A wide variety of organic solvents which are substantially water-immiscible may be used in the process of the present invention. Preferably the solvent is one which does not form an azeotrope with acrylonitrile so that the subsequent separation of the solvent from the acrylonitrile can be carried out without difficulty. It is also preferred to use solvents which boil at a higher temperature than acrylonitrile. Suitable solvents include hydrocarbons, such as xylene, cumene, styrene and petroleum ether, chlorinated hydrocarbons such as tetrachloroethane and chlorobenzene ethers such as anisole and diisopropyl ether, higher ketones such as acetophenone, and esters such as butyl phthalate and butyl acetate, or mixtures thereof. A preferred solvent is xylene.

The proportion of organic solvent to the crude acrylonitrile used in the extraction may vary within moderately wide limits depending on the solvent in question. In general it is suitable to use approximately equal volumes of solvent and crude acrylonitrile.

Likewise the proportion of water used may vary within moderately wide limits which again will depend to a large extent on the organic solvent chosen. In general the volume of water used in the extraction should be at least twice the volume of the crude acrylonitrile starting material.

The separation process of the present invention may be carried out in a number of different ways. In one method the crude acrylonitrile starting material is dissolved in the organic solvent, and the resulting solution is washed with water, for instance in a counter-current system, so that an organic solvent phase containing acrylonitrile but substantially no acetonitrile is obtained. The aqueous raffinate contains the acetonitrile together with small amounts of acrylonitrile, and it is a further feature of the invention to extract the aqueous raffinate with fresh organic solvent to extract substantially all of the acrylonitrile into the organic solvent. This organic solvent solution of acrylonitrile, which will also contain some acetonitrile, may then be recycled to the original extraction.

In a preferred embodiment, the process of the invention is carried out in a counter-current system, e.g. a column into which the crude acrylonitrile solution is fed at an intermediate point. Water is introduced at the head of the column and fresh organic solvent is introduced at the foot of the column. From the head of the column an organic solvent solution of acrylonitrile containing substantially no acetonitrile is withdrawn, and from the foot of the column an aqueous phase is withdrawn containing acetonitrile and substantially no acrylonitrile, the latter having been extracted from the aqueous phase by the fresh organic solvent entering at the base of the column. In the case of a solvent/acrylonitrile mixture having a specific gravity greater than 1, the feed points are suitably modified.

Acrylonitrile, substantially free from acetonitrile, can subsequently be recovered from the organic solvent phase, for instance by a simple fractional distillation, or by a steam distillation.

The process of the invention is further illustrated with reference to the following examples.

*Example 1*

Acrylonitrile containing 3% by weight of acetonitrile was dissolved in an equal volume of xylene, and the solution was extracted in a counter-current column with 2.8 volumes of water per volume of acrylonitrile solution. The organic solvent solution of acrylonitrile withdrawn from the head of the column contained less than 0.1% of acetonitrile based on the acrylonitrile.

*Example 2*

Acrylonitrile containing 3% weight of acetonitrile was fed at 130 g./hr. to an intermediate point, 45 cm. from the base, of a 2.2 cm. bore x 165 cm. long pulsed washing column, packed with Berl saddles. Xylene was fed to the base of the column at 130 g./hr. and water to the head of the column at 900 g./hr. The organic solvent solution of acrylonitrile withdrawn from the head of the column contained about 500 p.p.m. of acetonitrile. Purified acrylonitrile was separated from the solvent solution by a simple distillation. The aqueous phase withdrawn from the base of the column contained 0.4% w./v. acetonitrile and 1.2% w./v. acrylonitrile.

Further increases in the relative proportion of acetonitrile to acrylonitrile in the aqueous raffinate withdrawn from the base of the column can be achieved by simply increasing the efficiency of the lower extraction section of the column.

I claim:

1. A process for the separation of acrylonitrile from a mixture of acrylonitrile and acetonitrile which comprises extracting a mixture containing less than 18% by weight of acetonitrile with water and xylene, whereby the acetonitrile is extracted into the water and acrylonitrile is extracted into the xylene.

2. A process as claimed in claim 1 wherein the mixture contains about 2 to 3% by weight of acetonitrile.

3. A process as claimed in claim 1 wherein the volume of xylene employed in the extraction is approximately equal to the volume of crude acrylonitrile mixture.

4. A process as claimed in claim 1 carried out in a counter-current system.

5. A process as claimed in claim 4 wherein the crude acrylonitrile mixture is fed to an intermediate point in the column and is contacted therein with water and the xylene, the water entering and the organic solvent solution of acrylonitrile leaving one end of the column and the organic solvent entering and the aqueous phase leaving the opposite end.

6. A process as claimed in claim 1 wherein the aqueous raffinate resulting from the extraction and containing some acrylonitrile is subjected to a further extraction with fresh organic solvent.

7. A process as claimed in claim 6 wherein after the further extraction of aqueous raffinate phase the resulting xylene solution of acrylonitrile containing some acetonitrile is recycled to the original extraction stage.

References Cited in the file of this patent

UNITED STATES PATENTS

| | | |
|---|---|---|
| 2,404,163 | Carpenter et al. | July 16, 1946 |
| 2,719,169 | De Croes et al. | Sept. 27, 1955 |
| 2,773,088 | Maslan | Dec. 4, 1956 |
| 2,848,387 | Glazier et al. | Aug. 19, 1958 |

FOREIGN PATENTS

| | | |
|---|---|---|
| 802,114 | Great Britain | Oct. 1, 1958 |

OTHER REFERENCES

Morton: "Laboratory Technique in Organic Chemistry," 1938, pp. 195–196.

Cyanamid, "The Chemistry of Acrylonitrile," second edition, 1959, p. 3.

"Handbook of Chemistry and Physics," 34th Ed., 1952, pp. 682–683.

UNITED STATES PATENT OFFICE
CERTIFICATE OF CORRECTION

Patent No. 3,133,957            May 19, 1964

Frederick James Bellringer

It is hereby certified that error appears in the above numbered patent requiring correction and that the said Letters Patent should read as corrected below.

Column 3, line 4, for "organic solvent" read -- xylene --.

Signed and sealed this 15th day of September 1964.

(SEAL)
Attest:

ERNEST W. SWIDER
Attesting Officer

EDWARD J. BRENNER
Commissioner of Patents